United States Patent [19]

Ringlee et al.

[11] Patent Number: 4,563,929
[45] Date of Patent: Jan. 14, 1986

[54] FIELD REPAIRABLE CIRCULAR SAW

[75] Inventors: David R. Ringlee, Gig Harbor; Paul G. Gaddis, Bellevue, both of Wash.

[73] Assignee: Weyerhaeuser Company, Tacoma, Wash.

[21] Appl. No.: 646,277

[22] Filed: Aug. 30, 1984

[51] Int. Cl.⁴ .......................................... B27B 33/02
[52] U.S. Cl. ...................................... 83/840; 83/844; 144/34 R; 144/241; 407/35; 407/43; 407/61
[58] Field of Search .................. 144/3 D, 34 R, 336, 144/218, 231, 236, 237; 407/47, 52, 35, 43, 61; 83/839, 840, 841, 844, 856, 698

[56] References Cited

U.S. PATENT DOCUMENTS

| | | | |
|---|---|---|---|
| 2,544,920 | 3/1951 | Fullerton | 83/839 |
| 2,670,766 | 3/1954 | Hiltebrand | 83/839 |
| 3,419,976 | 1/1969 | Reising | 83/839 |
| 3,804,138 | 4/1974 | Adcock | 144/34 F |
| 4,102,231 | 7/1978 | Jagers | 83/854 |
| 4,257,302 | 3/1981 | Heimbrand | 83/839 |

FOREIGN PATENT DOCUMENTS

| | | | |
|---|---|---|---|
| 524942 | 5/1956 | Canada . | |
| 579558 | 6/1933 | Fed. Rep. of Germany . | |
| 746444 | 5/1933 | France | 83/844 |
| 1120121 | 4/1956 | France . | |
| 637060 | 7/1983 | Switzerland | 144/218 |

OTHER PUBLICATIONS

*Recent Developments in Sawmill Research;* Timber of Canada; J. H. Jenkins, 1961, pp. 52-56.
Anon. Wood World, Apr. 1984, pp. 48, 50.

*Primary Examiner*—W. D. Bray

[57] ABSTRACT

The present invention is an improved heavy duty circular saw useful for tree falling in conjunction with mechanized feller/buncher equipment. The saw is characterized by ruggedness, easy field repairability, and safety of operation. It is constructed using a flat metallic saw plate of circular configuration. A series of flat segment members are attached around the periphery of the saw plate on each face. Each of these segment members has a plurality of buttress- or tooth-shaped tooth retaining portions on the outer periphery. These buttresses are formed with gullet-shaped spaces between them. The segment members are in an abutting end-to-end relationship on each face of the saw plate. Segment members on opposite sides of the plate are in a staggered configuration so that the abutting end portions of the members on one side are generally located opposite the central portions of the segment members on the opposite side. The tooth retaining buttresses on each side are maintained in an aligned relationship. The segment members are preferably attached to the saw plate by bolting to threaded bushings retained within apertures in the saw plate. Individual teeth, bolted to the opposed buttress-shaped portions of the segment members, complete the construction. The saw is particularly strong because the design forms a continuous interconnected ring or hoop around the periphery. Cutting forces are spread throughout the ring and then transmitted to the saw disk. The interconnected hoop is a strong safety feature since the loss of several bolts in the construction will not cause catastrophic failure to the saw.

13 Claims, 10 Drawing Figures

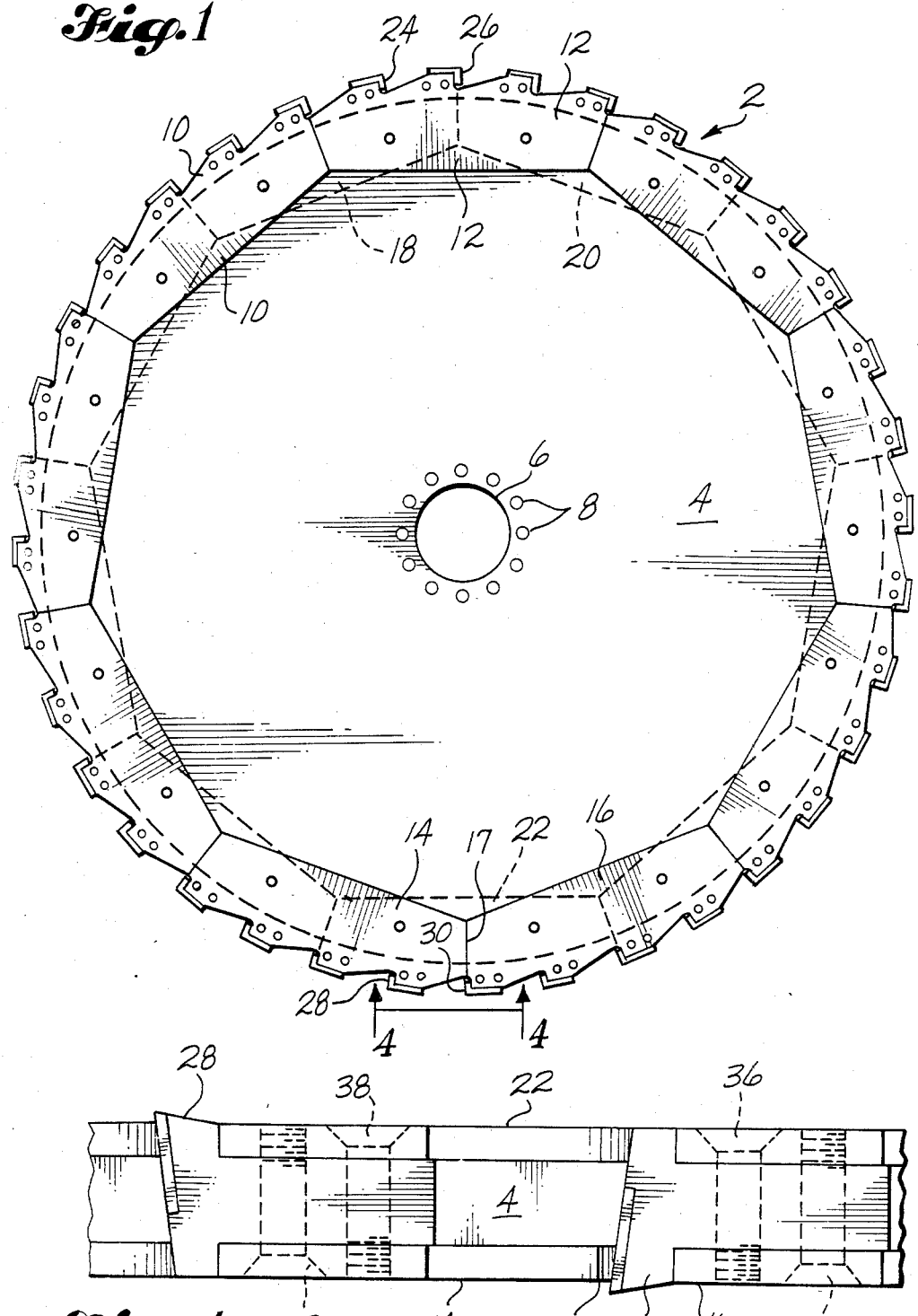

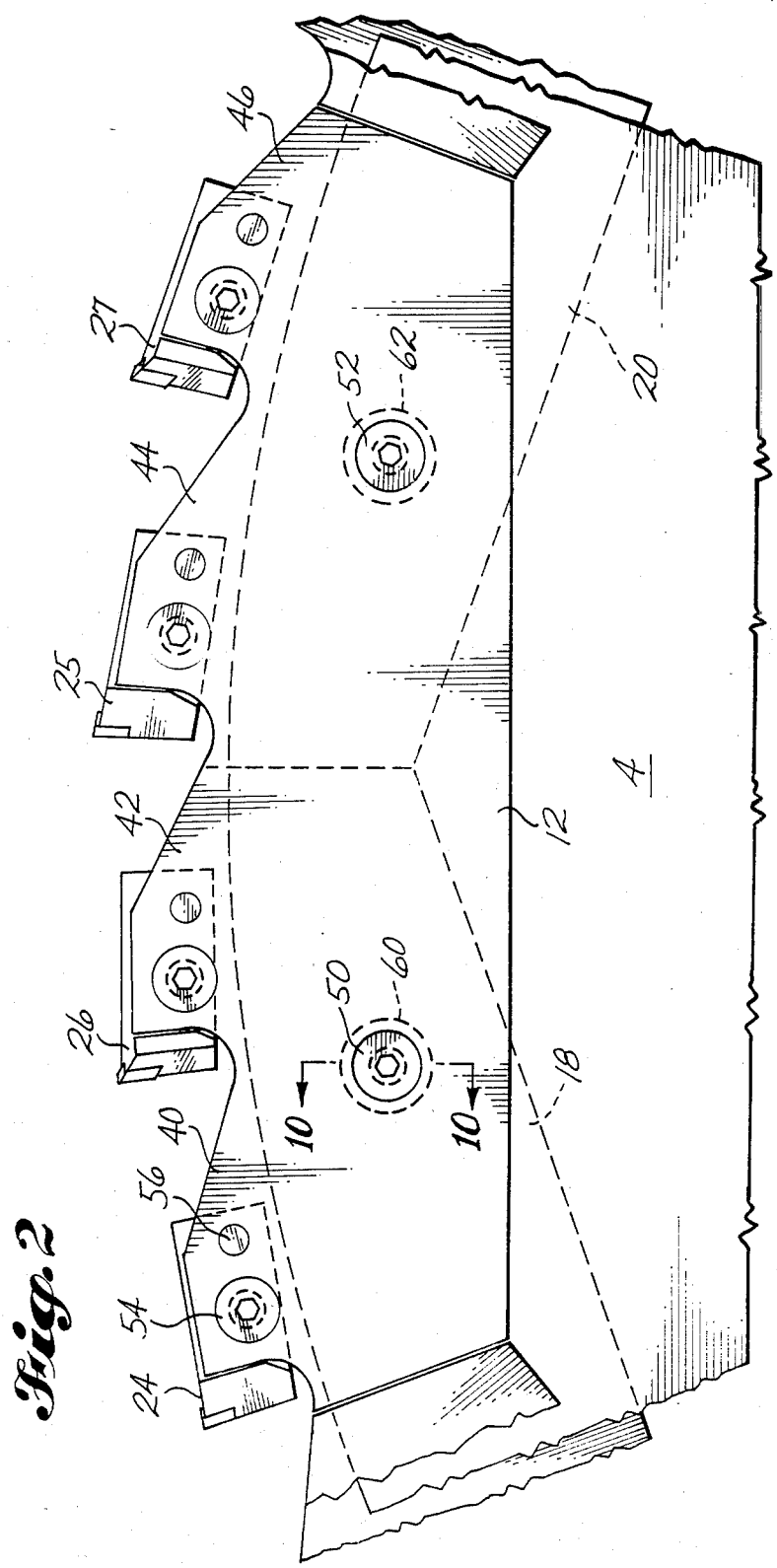

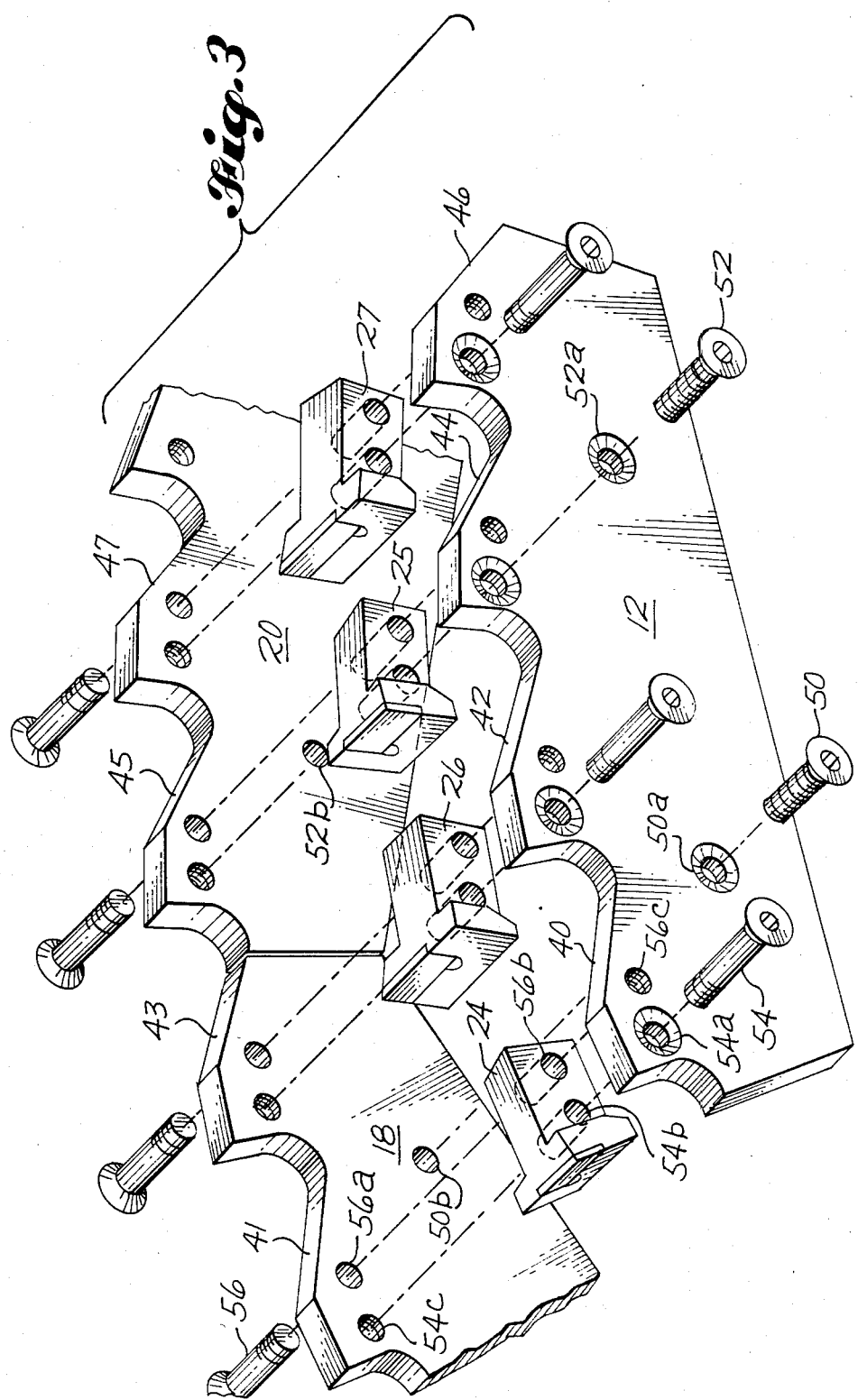

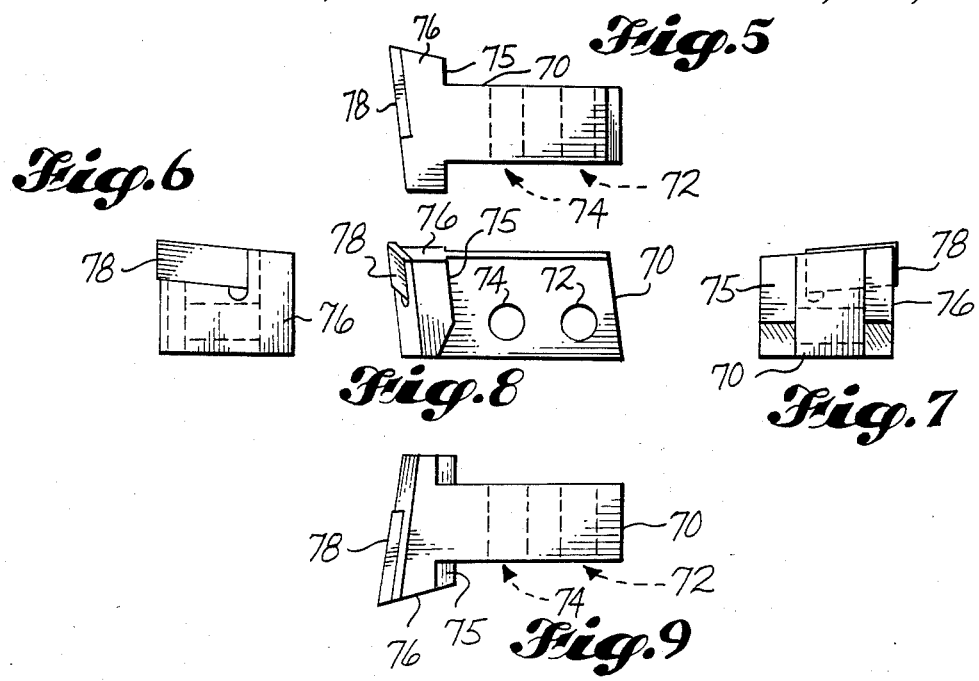
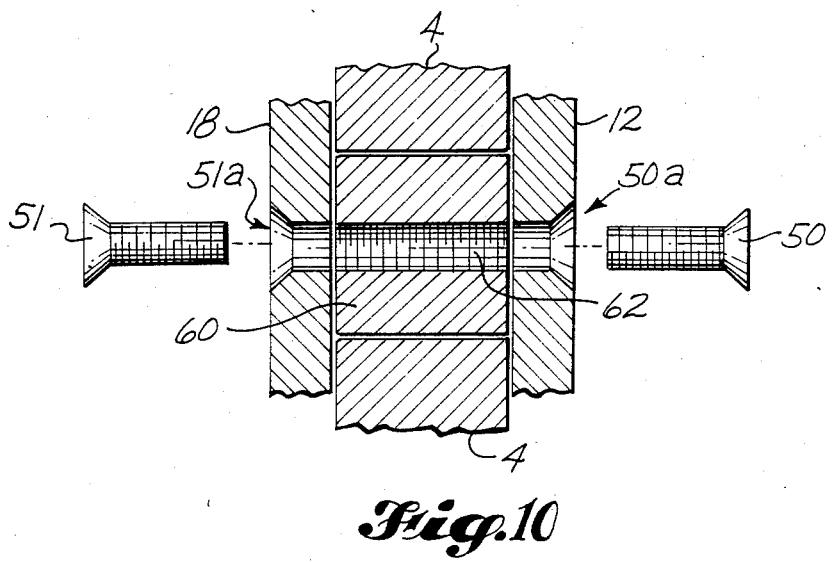

FIELD REPAIRABLE CIRCULAR SAW

BACKGROUND OF THE INVENTION

The present invention relates to a field repairable, heavy duty circular saw blade having an exceptionally long operating lifetime. The blade is particularly useful for felling small to medium sized trees when used in conjunction with available feller/buncher equipment.

In the past ten years automated felling and log bunching equipment has had a major increase in usage where the forestland is of moderate topography. This popularity is in large part due to the productivity gain and cost reduction when compared with individual loggers using chain saws. Some of this equipment is capable of harvesting tree stems at rates of 200 per hour when used under the most favorable conditions. Most mechanical felling equipment operates at much lower rates, however.

One of the popular types of mechanical harvesters in wide use today employs very heavy duty hydraulically operated shears to sever the tree from its stump. The use of these shears has resulted in a significant productivity gain, but this has not been without certain cost. Very often severe stress are induced in the lower part of the tree trunk which later result in splits and/or checking when the tree is processed into lumber.

More recently, harvesters have become available using large heavy duty circular saws to sever the trees. These have been quite successful in reducing stress damage in the butt portion of the log. However, the saw blades are quite expensive and their maximum life under field conditions has been far below expectations. In many cases blade life has been below 100 hours before destruction occurred due to accidental contact with a rock or similar object. In addition to the expense of replacing a dull or destroyed blade, installation of a new blade in the field is not a simple matter because the blades are very heavy.

Most of the circular saw blades available for the purpose described above are simply heavier duty versions of conventional circular saw blades used in sawmills. These may either have the teeth formed integrally around the circumference of the saw plate or the teeth can be individually inserted in locations provided around the periphery. In either case, the expensive saw plate itself is readily subject to damage and often is beyond repair when such damage has occurred.

Numerous designs of composite types of circular saws have been developed over the years. Many of these have as one object the preservation of the relatively expensive saw plate. A favorite design has been the use of individual segments riveted or bolted around the periphery of the saw plate. In almost all instances these have been attached by an arrangement in which the periphery of the plate is turned or ground into a tongue which mates with an equivalent groove in the individual segments. In most cases each segment will have several teeth permanently formed around its periphery. In one or more teeth are severely damaged, the entire segment is then replaced. Saws of this type are seen in U.S. patents to Fullerton, No. 2,544,920; Hiltebrand, No. 2,670,766; Jagers, and No. 4,102,231; French Pat. No. 1,120,121; and German Pat. No. 579,558. U.S. Pat. No. 4,257,302 to Heimbrand, et al. shows a similar arrangement in which the individual segments have inserted rather than permanent teeth. In somewhat related patents, Reising, U.S. Pat. No. 3,419,976, shows a ditching wheel in which the teeth themselves have a saddle shaped base to straddle a plate. Each individual tooth is simply bolted to the plate. Adcock, U.S. Pat. No. 3,804,138, shows a brush cutting outrigger for use on the front of a crawler type tractor. Each individual tooth has a socket in its base and is pinned to a corresponding tongue on one of the brush cutter blade members. To date, none of these designs have been found generally satisfactory either for sawmill use or for field use in forest tree cutting. The blades have either been too complex or could not be built in a form which was sufficiently rugged.

SUMMARY OF THE INVENTION

The present invention relates to an extremely rugged circular saw which is readily field repairable if damaged during use. It comprises a flat metallic saw plate of circular configuration. This saw plate will normally have a central aperture for an arbor with a ring of appropriate bolt holes surrounding the arbor aperture. The saw plate has a plurality of flat segment members attached around the periphery of each side. Each segment member has a plurality of generally buttress-shaped or tooth-shaped tooth retaining portions located on its the outer edge. The segment members on each side of the plate are in an abutting end-to-end relationship. Those segment members on one side of the plate are in a staggered relationship with those on the other side of the plate so that the abutting end portions on one side are generally located opposite the central portions of the members on the opposite side. However, the plates are positioned so that the tooth retaining portions on each side remain in an aligned opposing relationship. Means are provided for attaching the segment members to the saw plate. The structure further includes inserted teeth which are adapted to fit between the opposed buttress-shaped tooth retaining portions of the segment members along with tooth retaining means to lock the sawteeth in the segment plates and unite the segment plates into a rigid hoop.

The end portions of each segment plate are conveniently truncated along a radius of the saw plate. A preferred method of attaching the segment members to the plate includes forming apertures through the saw plate at equiangular positions around a circle which lies within and is concentric with the periphery of the plate. The number of apertures is preferably twice the number of segment members which are attached to one face of the plate, although other arrangements are possible. Each segment member is then formed with two shouldered or countersunk attachment apertures which correspond in number and location to the positions of the apertures within the saw plates. While the individual segment members can be directly bolted to threaded apertures in the saw plate, this is not the preferred construction. In order to minimize the stresses caused by threading, it is desirable that the attachment apertures in the saw plate be made large enough to include an inserted metallic bushing which is drilled and threaded axially. This construction has the further advantage that the bushing forms a sacrificial member in case of damage that would strip or deform the threads. The segment plates on each side are then retained by bolts or cap screws which are inserted from each side into the bushing.

Each of the tooth retaining buttresses will normally include two apertures for retaining bolts or cap screws.

In the preferred form of construction one of these apertures will be shouldered and drilled to pass the body of the bolt while the other will be threaded to retain a bolt. Bolts are chosen so as to have a length equivalent to the thickness of the structure and one bolt will then be inserted from each side. Each of the inserted teeth will contain longitudinally displaced drill holes located in positions corresponding to the apertures in the buttress-shaped tooth retaining portions. Each tooth will preferably have a metallic carbide insert portion which forms its cutting edge. The use of teeth with carbide inserts is not essential and tool steel teeth may be fully suitable in many environments. Many different tooth designs are possible. The tooth cutting edge geometry and material chosen will depend somewhat on the particular application and environment of use; e.g., hardwoods vs. softwoods, rocky vs. rock free soil, etc. The tooth shape will directly affect the quality of cut and will also affect the energy requirements of the saw.

A number of advantages accrue from constructing a saw blade in the above fashion. Use in a forest is far from a sterile hazard-free environment, with hidden rocks being a major cause of saw failure. The present saws are designed to have three concentric peripheral zones which can be considered as sacrificial layers before damage to the saw plate itself occurs. The first of these layers is the carbide inserts on the teeth. Very often when a foreign object is contacted only a few teeth will be damaged. In the present construction, each tooth is readily replaced simply by removing two cap screws. In the case of failure which goes beyond the carbide insert, the second layer of failure is the body of the tooth which is preferably made of a relatively soft steel. In the case of severe damage, the third failure zone is the segment members which are also of relatively softer steel than the saw plates as are the bushings within the saw plate attachment apertures to which the segment members are bolted.

The saw described has additional advantages in addition to its ease of repair. The construction is particularly strong, compared with all the prior art saws of the same general type, because all of the parts are completely interlocked. The assembled segment plates and teeth form a structurally sound member in their own right even without being bolted to the saw plate. In a situation in which one or more of the bolts attaching the segment members to the saw plate should be lost, there is virtually no possibility of catastrophic destruction. This is because of the high integrity of the annulus or hoop formed by the segments and teeth.

It is an object of the present invention to provide a circular saw which is extremely rugged yet which is readily and simply field repairable.

It is another object to provide a saw which is built with a series of increasingly rugged sacrificial layers to protect the saw plate and in which the most common forms of damage are localized within an easily repaired outer layer.

It is a further object to provide a rugged saw which can be readily and easily repaired by the use of standard replaceable and interchangeable parts.

It is yet another object to provide a saw designed for a maximum quality cut with a minimum of energy consumption.

It is still another object to provide a saw in which the teeth are held in a unique and continuous ring or hoop around the periphery of the saw plate.

These and many other objects will become readily apparent to those skilled in the art upon reading the following detailed description taken in conjunction with the drawings.

BRIEF DESCRIPTION OF THE DRAWINGS

FIG. 1 is a side elevation view of the new circular saw.

FIG. 2 is a more detailed view of a portion of the periphery of the saw, as shown at the top of FIG. 1.

FIG. 3 is an exploded perspective view of the portion of the saw seen in FIG. 2.

FIG. 4 is a fragmentary detail of the edge of the saw as seen along line 4—4 of FIG. 1.

FIGS. 5-9 are, respectively, top, front, rear, left side, and bottom views of a right hand cutting tooth.

FIG. 10 is a fragmentary section view taken along line 10—10 of FIG. 2.

DESCRIPTION OF THE PREFERRED EMBODIMENTS

In the description which will follow, it will be understood by those skilled in the art that the terms front, rear, top, or bottom are relative and have no limiting meaning. The saw being described will normally be used in a horizontal position. For ease of description, it is convenient to consider it as being oriented in the more common vertical position.

The construction of the present improved saw can be readily understood by referring to the drawings. In FIG. 1, the assembled circular saw 2 comprises a heavy gauge circular saw plate 4. This contains the usual opening 6 for a saw arbor which is surrounded by a concentric equiangular group of mounting holes 8. A group of first side segment plates is shown at 10, 12, 14, and 16. These segment members are truncated at each end along a line which forms a radius of the saw plate. The segment members are abutted end to end, as at 17, around each side of the saw. The term "abutted" is used in its broad sense and should not be considered in its literal meaning of requiring actual physical contact. In practice, the adjoining area 17 will usually include a small gap to accommodate machining tolerances. A corresponding group of segmemt members 18, 20, 22 are located on the second side of the saw plate. However, these are displaced sufficiently from the segment members on the first side of the plate so that the joints are located opposite the central portion of the first side segment plates.

The saw shown in FIG. 1 is equipped with peripheral teeth of which those shown at 24, 25, and 28 are right side teeth and those at 26, 27, and 30 are left side cutters.

Reference to FIGS. 2-4 show more clearly how the segment members and teeth are assembled into a unitary ring or hoop-type structure. For the sake of simplifying the drawings, not all of the components have been numbered in each figure. Segment member 12 has formed on its outer periphery four buttress or tooth retaining members 40, 42, 44, and 46. Second side segment members 18 and 20 have corresponding buttresses 41, 43, 45, and 47. Since the segmemt members are in an overlapped relationship and are tied together by the tooth retaining bolts, it is essentially impossible for any member to be lost by a bolt failure. The teeth are attached to the buttress portions by flathead cap screws, only two of which are numbered at 54 and 56. Cap screw 54 passes through a shouldered or countersunk aperture 54a in segment plate 12, and equivalent drill hole 54b in tooth 24, and is threaded into aperture 54c in segment member 18. Cap screw 56 has an opposite orientation and passes through drill hole 56a in segment 18, drill hole 56b in tooth 24, and is threaded into aperture 56c in front segment member 12. The tooth mounting apertures; e.g., apertures 54, 56, are on circles outside of but concentric with the periphery of the saw plate. The forward apertures; e.g., aperture 54, are not necessarily on the same circle as the rear apertures; e.g., aperture 56. The segment members are bolted to the saw plate through shouldered or countersunk drill holes 50a and 52a by cap screws 50 and 52. Equivalent cap screws, not shown, pass through drill holes 50b and 52b in members 18 and 20, respectively. A different view of the assembly is seen from the edge in FIG. 4 where cap screws 32, 34, 36 and 38 retain teeth 28 and 30 between segment members 14, 16, and 22.

The area between the tooth holding buttresses can conveniently be machined in a form equivalent to the gullet of a conventional saw blade.

The preferred means of attachment of the segment members to saw plate 4 is best seen in FIGS. 2 and 10. Segment plates 12 and 18 are held by cap screws 50 and 51 which pass through corresponding shouldered apertures 50a, 51a, into threaded bushing 60. This bushing is preferably made of metal which is significantly softer than saw plate 4 so that any deformation which occurs will take place preferentially in the bushing rather than in the saw plate. It is quite possible to mount the segment members to the saw plate using only a single bolt pair. Full structural integrity is achieved by this practice. As an example, only one of the bolts 50 or 52 shown on FIG. 2 is essential. The structural and safety redundancy of two bolts, or a whole number multiple of two, is preferred, however.

The construction of a right hand cutter tooth is shown in FIGS. 5-9. FIG. 5 shows a top view of one of the teeth which has a shank portion 70, drilled apertures 72, 74, a head portion 76 and a sharpened carbide cutting insert 78. FIG. 6 is a front view of the same tooth, FIG. 7 a rear view, FIG. 8 a left side view, and FIG. 9 a bottom view of the same tooth. The teeth are preferably made with a shouldered portion 75 that bears snugly against the corresponding face area of the segment member buttresses. This arrangement helps to minimize shear forces on the bolts holding the teeth in the buttress-shaped retaining portion of the segment members. With this construction, it is possible to securely retain a tooth with a single bolt. When two bolts are used, it is not essential that they enter the buttress portions from opposite sides. This is a matter of convenience to more readily accommodate the countersunk areas for the bolt heads and enable them to be more closely spaced. The shank portion 70 of the teeth will normally be of the same thickness as the saw plate 4. The teeth can be machined from solid bar stock, but it is usually more economical to make them by precision investment casting.

An extended tree harvesting field trial was carried out using a saw made by the present construction. This saw was made with a saw plate 1,321 mm (52 in) in diameter and 25.4 mm (1 in) in thickness. Overall diameter was 1,416 mm (55¾ in). Nine segment members, each 9.5 mm (0.375 in) in thickness, were mounted on each face, each member having four teeth for a total of 36. Overall weight of the saw was approximately 325 kg (720 lb). This saw has shown a disk life which has exceeded 4,000 operating hours to date without failure.

The segment members have average lives of approximately 2,000 hours, although the exact lifetime is a function of the operating environment and is somewhat lower in very rocky areas. Each of the individual saw teeth has had a lifetime averaging about 750 hours, during which time approximately 10 replacements were made of the carbide inserts. Each carbide insert had an average life of approximately 75 hours. Most of the carbide failures are related to contacts with rocks or other hard debris. In the case of field damage, a single tooth can be replaced within five minutes and a complete rebuild, although rarely necessary, can be done in about two hours. The present saw is only slightly heavier than those currently available in the marketplace for similar tree falling applications. Since more of the weight is located near the periphery, it stores significantly more kinetic energy at a given speed of rotation than conventional saws. This enables lower operating speeds reducing cutting edge wear and increasing safety. The saw described earlier operates at 1,100 rpm. It will cut a tree 50 cm in diameter in less than ¼ second. In addition, the ability to select a tooth design specific for the job at hand, results in reduced energy consumption.

It will be apparent to those skilled in the art that many minor changes can be made in the design of the present saw without departing from the spirit of the invention. It is the intention of the inventors that the invention should be limited only by the following claims.

We claim:
1. A circular saw which comprises:
   a. a flat metallic saw plate of circular configuration;
   b. a plurality of flat segment members attached to each face of the saw plate around the entire periphery thereof, each segment member having a plurality of generally buttress-shaped tooth retaining portions located on the outer periphery thereof and extending beyond the periphery of the saw plate, said segment members being in an abutting end-to-end relationship, the segment members on opposite sides of the plate being in a staggered configuration so that the abutting end portions of the members on one side are generally located opposite the central portions of the segment members on the opposite side in a manner in which the tooth retaining portions on each side remain in aligned opposing relationship;
   c. segment member attachment means to attach the segment members to the saw plate;
   d. tooth means adapted to fit between the opposed buttress-shaped tooth retaining portions of the segment members; and
   e. tooth retaining means to lock the sawteeth between the segment members.

2. The saw of claim 1 in which the end portions of each segment member is truncated along a radius of the saw plate.

3. The saw of claim 1 in which the segment member attachment means include apertures formed through the saw plate at equiangular positions around a circle lying within and concentric with the periphery of the plate, the number of apertures being at least equal to the number of segment members attached to one face of the plate.

4. The saw of claim 3 in which the number of apertures within the saw plate is twice the number of segment members attached to one face of the plate.

5. The saw of claim 4 in which each segment member has two shouldered attachment apertures corresponding in location to the positions of the apertures within the saw plate.

6. The saw of claim 3 in which the segment attachment means includes a threaded metallic bushing inserted within each attachment aperture in the saw plate and further includes bolts threaded into the bushings from both sides of the assembly so as to lock the opposing segment members to the bushings.

7. The saw of claim 6 in which the bushings are of softer metal than the corresponding area of the saw plate.

8. The saw of claim 1 in which the tooth retaining means includes one shouldered aperture and one threaded aperture located in each buttress-shaped tooth retaining portion of the segment members, said apertures being located around circles lying outside of and concentric with the periphery of the saw plate.

9. The saw of claim 8 in which each tooth means contains two longitudinally displaced apertures located in positions corresponnding to the shouldered apertures in the buttress-shaped tooth retaining portions.

10. The saw of claim 9 in which the tooth retaining means further comprises two bolts passing in opposite directions through each tooth, each bolt being threaded into one of the opposed buttress-shaped portions of the segment members.

11. The saw of claim 10 in which each tooth means abuts snugly against the buttress-shaped retaining portions to minimize shear forces on the bolts.

12. The saw of claim 1 in which the combined segment members, tooth means and tooth retaining means form a structurally integral hoop.

13. The saw of claim 12 in which the opposing segment members are interconnected by the tooth retaining means.

* * * * *